United States Patent [19]

Roue et al.

[11] Patent Number: 4,689,131

[45] Date of Patent: Aug. 25, 1987

[54] POLYOXYALKYLENEPOLYAMINE REACTION PRODUCTS AND THEIR USE IN CATIONIC ELECTRODEPOSITION

[75] Inventors: Jean Roue, Othis; Yves LeDisert, Drancy; Philippe Faucher, Paris, all of France; Roger L. Scriven, Gibsonia, Pa.

[73] Assignee: Peintures Corona S.A., Valenciennes, France

[21] Appl. No.: 830,313

[22] Filed: Feb. 18, 1986

[30] Foreign Application Priority Data

Feb. 27, 1985 [EP] European Pat. Off. ........ 85400374.6

[51] Int. Cl.$^4$ ............ C08G 65/08; C08G 59/40; C08L 63/00; C25D 13/00
[52] U.S. Cl. ................ 204/181.7; 528/105; 528/106; 528/107; 524/901; 523/415
[58] Field of Search .......... 528/105, 106, 107; 524/901; 523/415; 204/181.7

[56] References Cited

U.S. PATENT DOCUMENTS

| | | | |
|---|---|---|---|
| 3,236,895 | 2/1966 | Lee et al. | 528/61 |
| 3,415,901 | 12/1968 | Schramm et al. | 528/105 |
| 3,455,806 | 7/1969 | Spoor et al. | 204/181 |
| 3,793,278 | 2/1974 | DeBona | 528/109 |
| 3,928,157 | 12/1975 | Suematsu et al. | 525/161 |
| 3,962,165 | 6/1976 | Bosso et al. | 528/113 |
| 3,975,346 | 8/1976 | Bosso et al. | 528/59 |
| 4,001,156 | 1/1977 | Bosso et al. | 528/111 |
| 4,031,050 | 6/1977 | Jerabek | 528/45 |
| 4,134,864 | 1/1979 | Belanger | 528/106 |
| 4,134,866 | 1/1979 | Tominaga et al. | 528/45 |
| 4,310,646 | 1/1982 | Kempter et al. | 524/901 |
| 4,423,166 | 12/1983 | Moriarity et al. | 528/111 |
| 4,432,850 | 2/1984 | Moriarity et al. | 204/181 C |
| 4,575,523 | 3/1986 | Anderson et al. | 528/901 |

*Primary Examiner*—John Kight
*Assistant Examiner*—Dennis R. Daley
*Attorney, Agent, or Firm*—William J. Uhl

[57] ABSTRACT

Ungelled reaction products of polyoxyalkylenepolyamies with monoepoxides and optionally with a polyfunctional material which contains groups capable of reacting with amino and/or hydroxyl groups are disclosed. The reaction products can be neutralized with acid and dispersed in aqueous medium where they are useful as additives for cationic electrodeposition baths to improve surface appearance of electrodeposited coatings.

16 Claims, No Drawings

POLYOXYALKYLENEPOLYAMINE REACTION PRODUCTS AND THEIR USE IN CATIONIC ELECTRODEPOSITION

BACKGROUND OF THE INVENTION

1. Field of the Invention

The present invention relates to ungelled reaction products prepared from polyoxyalkylenepolyamines and to the use of these reaction products for cationic electrodeposition.

2. Brief Description of the Prior Art

Electrodeposition as a coating application method involves the deposition of a film-forming composition under the influence of applied electrical potential. Electrodeposition has become increasingly important in the coatings industry because by comparison with non-electrophoretic coating means, electrodeposition offers higher paint utilizations, outstanding corrosion protection and low environmental contamination. Initially, electrodeposition was conducted with the workpiece being coated serving as the anode. This was familiarly referred to as anionic electrodeposition. However, in 1972, cationic electrodeposition was introduced commercially. Since that time, cationic electrodeposition has steadily gained in popularity and today is by far the most prevalent method of electrodeposition. Throughout the world more than 80 percent of all motor vehicles produced are given a primer coating by cationic electrodeposition. Other areas of application are primer coating or one-coat topcoating of automobile accessories, farm machinery, house and electrical appliances, steel furniture and structural components.

A serious problem associated with electrodeposition as practiced industrially is appearance defects in films. Such defects include film rupturing, the formation of pinholes and craters. The sources of film defects unfortunately are many and some of the more important sources are believed to be impurities or contaminants in the electrodeposition bath which may be, for example, oil or pretreatment chemicals introduced into the bath along with the article to be coated. One solution to the problem is to eliminate the impurities or source of contamination. However, this is not always practical on an industrial scale.

U.S. Pat. No. 4,423,166 describes an additive which can be added to a cationic electrodeposition bath to improve surface appearance of the electrodeposited coatings. The agent is the ungelled reaction product of a polyepoxide and a polyoxyalkylenepolyamine. Unfortunately, although being effective in improving surface appearance, the reaction product can cause adhesion problems of the electrodeposited coatings to subsequently applied materials such as sealer coats, top coats and adhesives.

SUMMARY OF THE INVENTION

In accordance with the present invention, an additive for use in cationic electrodeposition to improve surface appearance in electrodeposition coatings is provided. Besides improving surface appearance, the additive does not adversely affect the adhesion of subsequently applied materials such as top coats.

The additive is the ungelled reaction product of a polyoxyalkylenepolyamine with a monoepoxide and optionally a polyfunctional material which contains groups capable of reacting with amino and/or hydroxyl groups.

DETAILED DESCRIPTION

The polyoxyalkylenepolyamines are usually first reacted with the monoepoxide and optionally further reacted with the polyfunctional material which contains groups capable of reacting with amines, such as unreacted primary and secondary amino groups of the polyoxyalkylenepolyamine, and/or capable of reacting with hydroxyl groups, such as those associated with ring opening of the monoepoxide upon reaction with the polyoxyalkylenepolyamine. Alternately, the polyoxyalkylenepolyamine can first be reacted with a reactive polyfunctional material followed by reaction with the monoepoxide, or the polyoxyalkylenepolyamine can be reacted simultaneously with the monoepoxide and a reactive polyfunctional material. However, the sequential reaction in which the polyoxyalkylenepolyamine is reacted first with the monoepoxide and then optionally with the polyfunctional material is preferred.

The polyoxyalkylenepolyamines useful in the practice of the invention are preferably diamines and examples include those having the following structural formula:

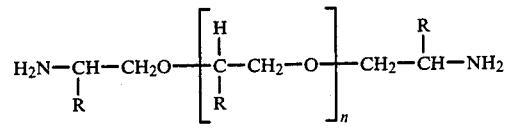

wherein R can be the same or different and is selected from the class consisting of hydrogen, lower alkyl radicals having from 1 to 6 carbon atoms and n represents an integer of from about 1 to 50, preferably 5 to 35. A number of such polyoxyalkylenepolyamines are described in more detail in U.S. Pat. No. 3,236,895, column 2, lines 40-72; methods of preparation of the polyoxyalkylenepolyamines are illustrated in the patent in Examples 4, 5, 6 and 8-12 in columns 4 to 9 thereof; the aforementioned portions of U.S. Pat. No. 3,236,895 hereby being incorporated by reference.

Mixed polyoxyalkylenepolyamines can be used, that is, those in which the oxyalkylene group can be selected from more than one moiety. Examples would be mixed polyoxyethylene-propylenepolyamines such as those having the following structural formula:

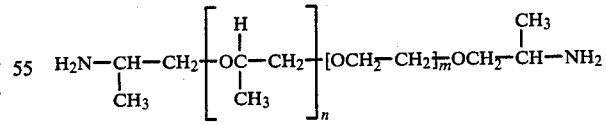

wherein n+m is equal to 1 to 50, preferably 5 to 35, m is equal to 1 to 49, preferably 5 to 30, and n is equal to 1 to 49, preferably 5 to 30.

Besides the polyoxyalkylenepolyamines mentioned above, derivatives of polyoxyalkylenepolyamines may also be usable. Examples of suitable derivatives would be aminoalkylene derivatives which are prepared by reacting polyoxyalkylenepolyamines such as those mentioned above with acrylonitrile followed by hydrogenation of the reaction product. An example of a suitable derivative would be that of the following structural formula:

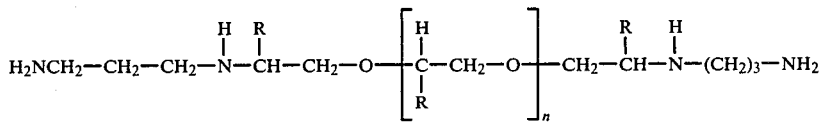

wherein R and n have the meanings mentioned above.

Therefore, in the practice of the invention, where the expression "polyoxyalkylenepolyamines" is used, what is intended are polyamines containing both oxyalkylene groups and at least two amino groups, preferably primary amino groups, per molecule. Preferably, the polyoxyalkylenepolyamine contains oxypropyl groups. The polyamine preferably will have a molecular weight (number average) of about 137 to 3600, more preferably about 400 to 3000, and most preferably 800 to 2500. The polyamines will preferably have equivalent weights, i.e., based on amine hydrogen, of about 34 to 900, more preferably about 100 to 750, and most preferably 200 to 625. In determining the equivalent weights, the primary amines are considered to be difunctional. Products with molecular weights much higher than 3600 and a high alkylene oxide content, that is, greater than $C_3$, are not preferred because of poor solubility characteristics.

The monoepoxides which are used in the practice of the invention can be selected from those having the following structural formula:

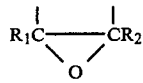

where $R_1$ and $R_2$ can be the same or different and include hydrogen, alkyl including cycloalkyl, preferably containing from 1 to 18 carbon atoms, aryl containing from 6 to 18 carbon atoms, substituted alkyl and substituted aryl moieties such as —$CH_2OR_3$ and

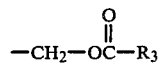

where $R_3$ is alkyl, including cycloalkyl, aryl and substituted alkyl, including cycloalkyl, and substituted aryl in which the alkyl contains from 1 to 18 carbon atoms and the aryl contains from 6 to 18 carbon atoms. $R_1$ and $R_2$ can be unsubstituted or substituted with substituents as long as the substituents do not interfere with the reaction of the epoxy with the polyoxyalkylenepolyamine, and the substituents are of such a nature or employed under conditions that they will not gel the reaction mixture. Preferred monoepoxides are 1,2-epoxy-containing materials having the structural formula:

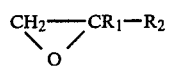

wherein $R_1$ is hydrogen or methyl and $R_2$ is hydrogen, alkyl including cycloalkyl, preferably containing from 1 to 18 carbon atoms, aryl containing from 6 to 18 carbon atoms, substituted alkyl and substituted aryl moieties such as —$CH_2OR_3$ and

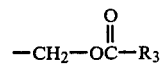

where $R_3$ is alkyl including cycloalkyl, aryl and substituted alkyl including cycloalkyl, substituted aryl in which the alkyl contains from 1 to 18 carbon atoms, and the aryl contains from 6 to 18 carbon atoms. $R_1$ and $R_2$ can be unsubstituted or substituted with substituents as long as the substituents do not interfere with the reaction of the epoxy with the polyoxyalkylenepolyamine, and the substituents are of such a nature or employed under conditions that they will not gel the reaction mixture.

Examples of suitable monoepoxides are alkylene oxides containing from 2 to 30 carbon atoms including ethylene oxide, propylene oxide, 1,2-butylene oxide, 1,2-pentene oxide, 1,2-dodecene oxide, styrene oxide and glycidol. Examples of other suitable materials are glycidyl esters of monobasic acids such as glycidyl acrylate, glycidyl methacrylate, glycidyl acetate, glycidyl butyrate, glycidyl palmitate, glycidyl laurate and glycidyl esters sold under the trademark CARDURA® E. Other suitable materials are glycidyl ethers of alcohols and phenols such as butyl glycidyl ether, 2-ethylhexyl glycidyl ether, phenyl glycidyl ether and para-(tertiary-butyl)phenyl glycidyl ether. Other suitable materials although less preferred are 2,3-butylene oxide, 4-phenoxy-2,3-butylene oxide. Preferred are butyl glycidyl ether and styrene oxide.

As mentioned above, preferably after reaction of the polyoxyalkylenepolyamine with the monoepoxide, the reaction product may optionally be further reacted with a polyfunctional material which contains groups reactive with any remaining unreacted amino groups and/or reactive with any of the hydroxyl groups which are present or are formed from ring opening of the monoepoxide, i.e.,

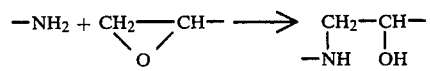

Further reaction with the polyfunctional material chain extends the polyoxyalkylenepolyamine reaction product, increasing its molecular weight and has been found to alleviate some problems such as sticky films, low throwpower and electrode gassing.

Examples of suitable polyfunctional materials are polyacrylates, polyisocyanates, polycarboxylic acids and polyepoxides.

The preferred molecular weights of said materials are less than 1000, and more preferably from 100 and 600.

Examples of polyacrylates are those which contain at least two alpha, beta-ethylenically unsaturated carbonyl groups, i.e., groups of the structure:

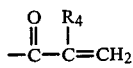

per molecule where $R_4$ is hydrogen, which is preferred, or lower alkyl containing from 1 to 4 carbon atoms such as methyl.

The unsaturated carbonyl groups are usually attached to a nitrogen or oxygen atom and are represented by the following structural formulas:

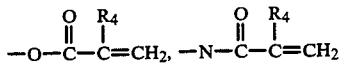

where $R_4$ is as defined above. The organic radical to which the alpha, beta-ethylenically unsaturated carbonyl groups are attached can be selected from alkyl, aryl and substituted alkyl and aryl groups provided the substituents do not adversely affect reaction with the amino groups. The organic radical preferably has a molecular weight less than about 500. The preferred raaction scheme with the polyacrylate is via a Michael reaction with the amine groups associated with the polyoxyalkylenepolyamine. Alternately, reaction may also occur through transamidification or through transesterification.

The preferred polyacrylates are compounds that can be formed from reacting organic polyols with acrylic or methacrylic acid. Examples of suitable compounds include ethylene glycol diacrylate, 1,4-butanediol dimethacrylate, 1,6-hexanediol diacrylate, bisphenol A diacrylate, diethylene glycol diacrylate, and trimethylolpropane triacrylate. Examples of other materials containing the alpha, beta-ethylenically unsaturated carbonyl groups are reaction products of polyisocyanates, preferably diisocyanates such as toluene diisocyanate, with hydroxyl-containing acrylic and methacrylic esters such as 2-hydroxyethyl acrylate or hydroxypropyl methacrylate; reaction products of polyepoxides preferably diepoxides such as the diglycidyl ether of bisphenol A with acrylic or methacrylic acid; transetherification reaction products of polyols, preferably diols such as ethylene glycol, 1,4-butanediol and 1,6-hexanedoil with N-alkoxymethylacrylamides or methacrylamides specifically N-butoxymethacrylamide.

The polyisocyanates which are usable in the practice of the invention are organic polyisocyanates which are capable of reacting with both the amino and hydroxyl groups. Specific examples include aliphatic compounds such as trimethylene, tetramethylene, hexamethylene diisocyanate, 2,4,4-trimethylhexane-1,6-diisocyanate, 2,2,4-trimethylhexane-1,6-diisocyanate; cycloalkylene compounds such as 1,4-cyclohexane diisocyanate; aromatic compounds such as p-phenylene diisocyanate; aliphatic-aromatic compounds such as 4,4'-diphenylene methane diisocyanate, 2,4- or 2,6-toluene diisocyanate including isomeric mixtures thereof. Higher polyisocyanates can be employed such as triisocyanates, although their use is not preferred. An example would include triphenylmethane-4,4',4"-triisocyanate. Also, NCO-prepolymers which are obtained from reacting the organic polyisocyanates described above with a polymeric polyol such that there is an excess of isocyanate to hydroxyl groups. Examples of suitable polymeric polyols include polyether polyols and polyester polyols including polycaprolactone polyols.

The polycarboxylic acids which are usable in the practice of the invention are those which are capable of reacting with the hydroxyl groups or with primary or secondary amino groups and include not only the acids themselves but their reactive functional equivalents such as anhydrides and lower alkyl, i.e., $C_1$-$C_4$ alcohol esters thereof. Examples of suitable materials include phthalic acid, isophthalic acid, terephthalic acid, tetrahydrophthalic acid, hexahydrophthalic acid, adipic acid, azelaic acid, sebacic acid and the like.

The polyepoxides which are usable in the practice of the invention are those which are capable of reacting with the remaining amino groups of the reacted polyoxyalkylenepolyamine. Alternately, the polyoxyalkylenepolyamine may be modified such that it contains carboxylic acid functionality which is reactive with the polyepoxide. An example of this is shown below. Examples of suitable polyepoxides are those which contain two or more and preferably only two epoxy groups per molecule. The polyepoxides may be any of the well-known types of polyglycidyl ethers of polyphenol, for example, bisphenols such as bisphenol A. Also, polyglycidyl ethers of polyhydric alcohols such as ethylene glycol, propylene glycol and diethylene glycol may be used. Also, polyglycidyl esters of polycarboxylic acids such as those mentioned above may be used.

The reaction conditions for preparing the reaction products of the invention are not difficult nor extreme. For example, the monoepoxide can be added to the polyoxyalkylenepolyamine under a nitrogen atmosphere and at a temperature sufficient to induce reaction, for example, from about 50° to 200° C. The progress of the reaction can be monitored spectrally by the disappearance of epoxide functionality or by titration and the reaction will usually take at least one hour, typically from about 1 to 100 hours.

The polyfunctional material can be added to the reaction mixture at a temperature below that of reaction and the temperature gradually raised to induce reaction. The progress of the subsequent chain extension reaction can be monitored by increases in viscosity or be monitored by the disappearance of functionality which can be determined spectrally such as NCO or epoxide. The time and temperature of the subsequent reaction will vary depending on the reactants selected, their amounts and the presence or absence of catalyst.

With regard to the amounts of polyoxyalkylenepolyamine, monoepoxide and polyfunctional material which are reacted with one another, the amounts will vary quite widely. For each equivalent of polyoxyalkylenepolyamine, there should be at least 0.01 equivalent of monoepoxide. An equivalent excess of monoepoxide does not appear to be disadvantageous although amounts greater than 1.7 equivalent per equivalent of polyamine do not appear to offer any advantage. The preferred equivalent range is 0.05 to 1.5, more preferably 0.1 to 1.3 equivalents of monoepoxide per equivalent of amine. The term equivalent indicates the number of reacting groups in the molecule.

The amount of polyfunctional material is preferably one equivalent or less per equivalent of amine and/or hydroxyl, more preferably 0.7 equivalents or less.

The reaction products of the presant invention can be modified by reaction with other materials, for example, partially capped polyisocyanates. These materials will participate in curing of the electro-deposited coating and can assist in the dispersion of the reaction product, for example, using a neutralizable amine such as dimethylethanolamine as the capping agent. Besides partially capped polyisocyanate, the reaction products of the present invention can be present with fully capped polyisocyanates.

The reactions described above can be conducted neat or in the presence of solvent. The solvent is one which is non-reactive with the various functionalities such as epoxide groups, amino groups, hydroxyl groups, isocyanate groups, carboxylic acid groups and unsaturated groups under the reaction conditions employed. Suitable solvents include hydrocarbons, ethers, and esters. The amount of solvent used will vary between about 0 to 90 and preferably about 5 to 50 percent by weight based on total weight of the reaction mixture.

The reaction products of the present invention are ungelled which means they are substantially free of crosslinking and have a measurable intrinsic viscosity when dissolved in a suitable solvent. The intrinsic viscosity of the reaction product is an indication of its molecular weight. A gelled reaction product, on the other hand, since it is of essentially infinitely high molecular weight, will have an intrinsic viscosity too high to measure.

Some specific examples of reaction products in accordance with the present invention include:
- 1 mole (4 equivalents, i.e., 4 H to be substituted) of polyoxypropylenediamine (molecular weight (MW) about 2000)
- 2 moles (2 equivalents) of the monoepoxide butyl glycidyl ether or styrene oxide and
- ½ mole (1 equivalent) of the diacrylate 1,6-hexanediol diacrylate
- 1 mole (4 equivalents) of polyoxypropylenediamine (MW about 2000)
- 4–5 moles (4–5 equivalents) of butyl glycidyl ether or styrene oxide
- 1 mole (4 equivalents) of polyoxypropylenediamine (MW about 2000)
- 4 moles (4–5 equivalents) of butyl glycidyl ether or styrene oxide
- 0.1 to 1 mole (0.2 to 2 equivalents) of isophorone diisocyanate Increasing the amounts of the isocyanate will increase the molecular weight of the reaction product and may increase throwpower of the electrodeposition bath to which the reaction product is added.

Besides chain extending through the reaction sequence as described above, other reaction sequences can be used in the chain extension sion reaction. For example, an ungelled reaction product from the following reactants can be prepared:
- 1 mole (4 equivalents) of polyoxyalkylenediamine (MW≃2000)
- 4 moles (4 equivalents) of a monoepoxide
- 2 moles (2 anhydride equivalent) of an acid anhydride
- 1 mole (2 equivalents) of a diepoxide.

In the example above, the reaction of the polyoxyalkylenepolyamine with the monoepoxide will form a reaction product containing on average 4 hydroxyl groups per molecule. This reaction product can then be reacted with the anhydride to form a reaction product having on average two hydroxyl groups and two carboxylic acid groups per molecule. This reaction product can then be chain extended with the diepoxide through the reaction of the carboxylic acid and the epoxide groups. Also, a reaction product from the following reactants can be prepared:

- 1 mole (4 equivalents) of a polyoxyalkylenediamine (MW≃2000)
- 4 moles (4 equivalents) of a monoepoxide
- 2 moles of a half-capped diisocyanate
- 1 mole (2 equivalents) of a diol In this example, the polyoxyalkylenepolyamine reacts with the monoepoxide to form a tetraol. This reaction product is then reacted with the partially capped diisocyanate to form a reaction product containing on an average two hydroxyl groups and two capped isocyanate groups per molecule. This reaction product in turn can then be chain extended with a diol by heating the two at a temperature sufficient to uncap the capped diisocyanate groups and permitting chain extension through reaction with the diol.

For use in cationic electrodeposition, the reaction products are at least partially neutralized with acid to form amine salts or are quaternized with excess monoepoxide and acid to form quaternary ammonium salts.

Suitable acids include organic acids such as formic acid, lactic acid and acetic acid, and inorganic acids such as phosphoric acid. The extent of neutralization depends upon the particular reaction product and usually only sufficient acid is added to solubilize or disperse the reaction product.

The reaction products may be dispersible by themselves, or may have to be combined with a surfactant for dispersion. A conventional way of dispersing the reaction products is to combine them with a portion of the pigment grinding vehicle or with the electrocoating resin and dispersing the mixture in aqueous medium.

The reaction products of the present invention are particularly useful in combination with high throwpower cationic electrodepositable resins (main film-forming resin) which are used in the electrocoating of articles with complex shapes such as automobiles.

Throwpower, as used in the context of this invention, is the ability of the cationic resin to coat completely the recessed areas and shielded portions of the cathode. Several methods have been proposed for measuring throwpower including the Ford cell test and the General Motors cell test. See, for example, Brewer et al, JOURNAL OF PAINT TECHNOLOGY, 41, No. 535, pages 461–471 (1969); and Gilchrist et al, AMERICAN CHEMICAL SOCIETY, DIV. OF ORGANIC COATINGS AND PLASTICS CHEMISTRY, PREPRINT BOOK 31, No. 1, pages 346–356, Los Angeles Meeting, March-April 1971. Throwpower is reported in inches, the higher the value, the greater the throwpower. In this invention, where throwpower is mentioned, General Motors or GM throwpower is intended.

Accordingly, the reaction products of the present invention which typically have GM throwpower of 6 inches (15.2 cm) or less are useful in combination with high throwpower cationic electrodepositable resins having GM throwpower of 10 inches (25.4 cm), preferably 12 inches (30.5 cm) or more.

Examples of high throwpower cationic electrodepositable resins inclqde amine salt group-containing resins which are the acid-solubilized reaction products of polyepoxides and primary or secondary amines such as described in U.S. Pat. No. 4,031,050 to Jerabek. Usually, these amine salt group-containing resins are used in combination with a blocked isocyanate curing agent. The isocyanate can be fully blocked as described in the aforementioned U.S. Pat. No. 4,031,050, or the isocyanate can be partially blocked and reacted with a resin.

Such resinous systems are described in U.S. Pat. No. 3,947,358 to Jerabek et al. Also, such one-component compositions are described in U.S. Pat. No. 4,134,866 and DE-OS No. 2,752,255. Besides high throwpower cationic electrodepositable resins, the cationic adducts of the invention can also be used with low throwpower resins such as cationic acrylic resins. Examples of these resins are described in U.S. Pat. Nos. 3,455,806 and 3,928,157.

Besides amine salt group-containing resins, quaternary ammonium salt group-containing resins can also be employed. Examples of these resins are those which are formed from reacting an organic polyepoxide with a tertiary amine acid salt. Such resins are described in U.S. Pat. Nos. 3,962,165; 3,975,346 and 4,001,156 to Bosso and Wismer. Examples of other cationic resins are ternary sulfonium salt group-containing resins such as those described in U.S. Pat. No. 3,793,278 to DeBona. Also, cationic electrodepositable resins which cure via a transesterification mechanism such as described in European Patent Application No. 12463 can also be employed.

The amount of the reaction product of the invention present in the coating composition is usually within the range of about 0.1 to 50, preferably 0.5 to 20, more preferably from about 1 to 10 percent by weight, based on total weight of resin solids. The principal film-forming cationic electrodepositable resin is present in amounts of 50 to 99, preferably 75 to 95 percent by weight based on weight of resin solids.

In addition to the principal film-forming cationic resin and the reaction products of the present invention, other organic materials which contribute to resin solids content may be present in the aqueous dispersion. Such materials include plasticizers such as polycaprolactones, pigment grinding vehicles, high boiling esters such as esters of phthalic acid with monohydric aliphatic alcohols having 4-10 carbon atoms such as n-butanol and octanol. Also, aliphatic and aromatic polyether polyols such as ethylene and/or propylene oxide reaction products of phenols such as cresol and nonyl phenol and bisphenol A can be present. Also, surfactants, wetting agents and defoamers can be present. Examples include alkyl imidazolines, acetylenic alcohols and silicones. When used, these materials are present in amounts up to 25 percent by weight based on weight of resin solids.

The resin solids content of the aqueous dispersion is at least 0.5 and usually from about 1 to 50 percent by weight based on total weight of the aqueous dispersion.

Besides water, the aqueous dispersion may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 4-methoxy,4-methyl-2pentanone, ethylene and propylene glycol, and the monoethyl, monobutyl and monohexyl ethers of ethylene glycol. The amount of coalescing solvent is not unduly critical and is generally between about 0.01 and 40 percent, preferably about 0.05 to about 25 percent by weight based on total weight of the aqueous medium.

In some instances, a pigment composition is included in the dispersion. The pigment composition may be of the conventional types, comprising, for example, iron oxides, lead oxides, strontium chromate, carbon black, clay, titanium dioxide, talc, barium sulfate, as well as color pigments such as cadmium yellow, cadmium red, chromium yellow and the like. The pigment content of the dispersion is usually expressed as the pigment-to-resin ratio. In the practice of the present invention, the pigment-to-resin ratio is usually within the range of 0.02 to 1:1.

When the aqueous dispersions as described above are used in electrodeposition, the aqueous dispersion is placed in contact with an electrically conductive anode and an electrically conductive cathode with the surface to be coated being the cathode. Following contact with the aqueous dispersion, an adherent film of the coating composition is deposited on the cathode and a sufficient voltage is impressed between the electrodes. The conditions under which the electrodeposition is carried out are, in general, similar to those used in electrodepositon of other types of coatings. The applied voltage may be varied and can be, for example, as low as one volt to as high as several thousand volts, but typically between 50 and 500 volts. The current density is usually between 0.5 ampere and 15 amperes per square foot (10.8–161.5 amperes per square meter) and tends to decrease during electrodeposition indicating the formation of an insulating film.

The coating compositions of the present invention can be applied to a variety of electroconductive substrates especially metal such as steel, aluminum, copper, magnesium and the like, but also including metallized plastic and conductive carbon-coated materials.

After the coating has been applied by electrocoating, it is cured, usually by baking at elevated temperature such as 90°–260° C. for about 1–30 minutes.

Illustrating the invention are the following examples which, however, are not to be considered as limiting the invention to their details. All parts and percentages in the examples as well as throughout the specification are by weight unless otherwise indicated.

EXAMPLE A

A conventional cationic resin was prepared from the following mixture of ingredients:

| Ingredients | Parts by Weight | Solids |
|---|---|---|
| EPON 829[1] | 702.2 | 702.2 |
| PCP-0200[2] | 263.4 | 263.4 |
| Xylene | 61.6 | |
| Bisphenol A | 197.8 | 197.8 |
| Benzyldimethylamine | 3.8 | |
| Capped isocyanate crosslinker[3] | 891 | 629.1 |
| Diketimine derived from diethylenetriamine and methyl isobutyl ketone (73% solids in methyl isobutyl ketone) | 75.3 | 54.7 |
| N—methylethanolamine | 59.1 | 59.1 |
| Phenoxypropanol | 126.9 | |
| Acetic acid | 29.5 | |
| Cationic surfactant[4] | 29.3 | |
| Deionized water | 2553.1 | |

[1] Epoxy resin made from reacting epichlorohydrin and bisphenol A having an epoxy equivalent of 188 commercially available from Shell Chemical Company.
[2] Polycaprolactone diol available from Union Carbide Corp.
[3] Polyurethane crosslinker formed from half-capping toluene diisocyanate (80/20 2,4-/2,6-isomer mixture) with 2-ethylhexanol and reacting this product with trimethylolpropane in a 3:1 molar ratio. The crosslinker is present as a solution in 2-ethoxyethanol.
[4] Cationic surfactant prepared by blending 120 parts of an alkyl imidazoline commercially available from Geigy Industrial Chemicals as GEIGY AMINE C, 120 parts by weight of an acetylenic alcohol commercially available from Air Products and Chemicals as SURFYNOL 104, 120 parts of 2-butoxyethanol and 221 parts by weight of deionized water and 19 parts of glacial acetic acid.

The EPON 829, PCP-0200 and xylene were charged to a reaction vessel and heated under a nitrogen atmosphere to 210° C. The reaction was held at reflux for about ½ hour to remove water. The reaction mixture was cooled to 150° C. and the bisphenol A and 1.6 parts of the benzyldimethylamine (catalyst) added. The reaction mixture was heated to 150°-190° C. and held at this temperature for about 1½ hours and then cooled to 130° C. The remaining portion of the benzyldimethylamine catalyst was added and the reaction mixture held at 130° C. for 2½ hours until a reduced Gardnar-Holdt viscosity (50 percent resin solids solution in 2-ethoxyethanol) of P was obtained.

The polyurethane crosslinker, the diketimine derivative and the N-methylethanolamine were then added and the temperature of the reaction mixture brought to 110° C. and held at this temperature for 1 hour.

The phenoxypropanol was added and the reaction mixture was dispersed in water by adding the reaction mixture to a mixture of the acetic acid, deionized water and the cationic surfactant.

EXAMPLE B

A polyoxyalkylenepolyamine-monoepoxide-polyacrylate was prepared from the following mixture of ingredients:

| Ingredients | Parts by Weight | Solids | Equivalents |
| --- | --- | --- | --- |
| JEFFAMINE D-2000[1] | 4056 | 4056 | 8 |
| Butyl glycidyl ether | 520 | 520 | 4 |
| Hexanediol diacrylate | 226 | 226 | 2 |
| Lactic acid (88%) | 204 | | |
| Deionized water | 107 | | |
| Butyl glycidyl ether | 640 | 640 | 4.9 |

[1]The JEFFAMINE D-2000 is a polyoxypropylenediamine having a molecular weight of 2000 available from Jefferson Chemical Company.

The JEFFAMINE D-2000 and the first portion of butyl glycidyl ether were charged to a reaction vessel under a nitrogen atmosphere and heated at 130° C. until a stalled viscosity (Q-R) and an epoxy equivalent of greater than 10,000 was obtained.

The temperature was adjusted to 120° C. followed by the addition of the hexanediol diacrylate. The reaction mixture was held at 130° C. for about 7 hours until a Gardner-Holdt viscosity of V was obtained.

The temperature was decreased to 80° C. and the lactic acid and water were then added. After 5 minutes the remaining portion of the butyl glycidyl ether was added and the reaction mixture held at 80° C. for about 8 hours until an acid value below 6 was obtained.

EXAMPLE C

A polyoxypropylenediamine having a molecular weight of 2000 was reacted with butyl glycidyl ether as follows:

| Ingredients | Parts by Weight | Solids | Equivalents |
| --- | --- | --- | --- |
| JEFFAMINE D-2000 | 2000 | 2000 | 4 |
| Butyl glycidyl ether | 546 | 546 | 4.2 |
| Methyl isobutyl ketone | 25 | | |

The JEFFAMINE D-2000 and the butyl glycidyl ether were charged to a reaction vessel under a nitrogen atmosphere and heated to 180° C. The reaction mixture was held at this temperature until 95 percent of the epoxy groups ware consumed, i.e., an epoxy equivalent of greater than 10,000. The reaction mixture was then cooled to 120° C., the methyl isobutyl ketone added, and the reaction mixture vacuum stripped.

EXAMPLE D

Isophorone diisocyanate half-capped with dimethylethanolamine was prepared from the following reaction mixture:

| Ingredients | Parts by Weight | Solids | Equivalents |
| --- | --- | --- | --- |
| Isophorone diisocyanate | 221 | 221 | 2 |
| Dimethylethanolamine | 89 | 89 | 1 |
| Methyl isobutyl ketone | 17 | | |

The isophorone diisocyanate and methyl isobutyl ketone were charged to a reaction vessel under a nitrogen atmosphere and heated to 40° C. The dimethylethanolamine was added slowly (2-3 hours) so as the temperature not to exceed 50° C. The reaction mixture was then held for one hour at 50° C. until an NCO equivalent of 320-340 was obtained.

EXAMPLE E

A half-capped isocyanate was prepared from condensing toluene diisocyanate (100 percent 2,4 isomer) with 2-ethylhexanol according to a process similar to Example D.

| Ingredients | Parts by Weight | Solids | Equivalents |
| --- | --- | --- | --- |
| Toluene diisocyanate | 174 | 174 | 2 |
| 2-Ethylhexanol | 133 | 133 | 1.02 |
| Methyl isobutyl ketone | 16 | | |

EXAMPLE F

The polyoxypropylenediamine-butyl glycidyl ether reaction product of Example C (average hydroxyl functionality=4) was reacted with the partially capped polyisocyanates of Examples D and E from the following ingredients:

| Ingredients | Parts by Weight | Solids | Equivalents |
| --- | --- | --- | --- |
| Reaction product of Example C | 1273 | 1273 | 2 |
| Partially capped isocyanate of Example E | 323 | 307 | 1 |
| Partially capped isocyanate of Example D | 343 | 325 | 1.05 |
| 2-Butoxyethanol | 97 | | |
| Lactic acid (88% pure in water) | 86 | | |
| Cationic surfactant of Example A | 63 | | |
| Deionized water | 3108 | | |

The reaction product of Example C and the partially capped isocyanate of Example E were charged to a reaction vessel under a nitrogen blanket and heated to 100° C. After 30 minutes at this temperature, the reaction mixture was checked by infra-red and no NCO groups were detected. The partially capped isocyanate of Example D was added and the temperature maintained at 100° C. for 2 hours followed by the addition of the 2-butoxyethanol. The reaction mixture was dispersed in water by adding the resin to a mixture of lactic acid, deionized water and the cationic surfactant. This dispersion was then diluted to 36 percent with deionized water.

EXAMPLE G

A polyoxypropylenediamine having a molecular weight of 2000 was reacted with ethyl hexyl glycidyl ether as follows:

| Ingredients | Parts by Weight | Solids | Equivalents |
|---|---|---|---|
| JEFFAMINE D-2000 | 2000 | 2000 | 4 |
| Ethyl hexyl glycidyl ether | 775 | 775 | 4.1 |
| Methyl isobutyl ketone | 250 | | |

The JEFFAMINE D-2000 and ethyl hexyl glycidyl ether were charged to a reaction vessel under a nitrogen atmosphere and heated to 180° C. The reaction mixture was held at this temperature until 96 percent of the epoxy groups were consumed, i.e., epoxy equivalent of greater than 10,000. The reaction mixture was then cooled to 120° C. and the methyl isobutyl ketone added. The reaction mixture was then vacuum stripped.

EXAMPLE H

The polyoxypropylenediamine-butyl glycidyl ether reaction product of Example C was reacted with isophorone diisocyanate and the partially capped polyisocyanates of Examples D and E as follows:

| Ingredients | Parts by Weight | Solids | Equivalents |
|---|---|---|---|
| Example C | 7638 | 7638 | 12 |
| Isophorone diisocyanate | 442 | 442 | 4 |
| Example D | 1308 | 1240 | 4 |
| Example E | 1292 | 1228 | 4 |

The reaction product of Example C was reacted under nitrogen with isophorone diisocyanate at 110°–120° C. until all the NCO groups were consumed as indicated by infra-red analysis. Then, the partially capped isocyanate of Example E was added slowly at 100° C. When all isocyanate groups were consumed, the reaction was continued with Example D according to the same process.

EXAMPLE I

An aqueous dispersion of polyepoxide polyoxyalkylenepolyamine resin was prepared as generally described in Example I of U.S. Pat. No. 4,432,850 from the following mixture of ingredients:

| Ingredients | Parts by Weight |
|---|---|
| JEFFAMINE D-2000 | 1415.9 |
| EPON 1001[1] | 489.1 |
| 2-Butoxyethanol | 179.8 |
| Polyurethane crosslinker[2] | 1814.3 |

[1] Polyglycidyl ether of bisphenol A having an epoxide equivalent of 523 available from Shell Chemical Company.
[2] Polyurethane crosslinker formed from half-capping toluene diisocyanate (80/20 2,4-/2,6-isomer mixture) with 2-butoxyethanol and reacting this product with trimethylolpropane in a 3:1 molar ratio. The crosslinker is a 70 percent solution in 2-ethoxyethanol.

The JEFFAMINE D-2000 was charged to a reaction vessel under a nitrogen atmosphere and heated to 90° C., followed by the addition of a solution of the EPON 1001 in the 2-butoxyethanol. The reaction mixture was heated to 110° C., held for two hours, followed by the addition of the polyurethane crosslinker. The reaction mixture was dispersed by combining 3700 parts by weight of the reaction mixture with 50.3 parts of lactic acid, 75.3 parts of the cationic surfactant of Example A and 4679.1 parts by weight of deionized water to form the dispersion.

Pigment Paste

Quaternizing Agent

| Ingredients | Parts by Weight | Solids |
|---|---|---|
| 2-Ethylhexanol half-capped toluene diisocyanate in methyl isobutyl ketone | 320 | 304 |
| Dimethylethanolamine | 87.2 | 87.2 |
| Aqueous lactic acid solution | 117.6 | 88.2 |
| 2-Butoxyethanol | 39.2 | |

The 2-ethylhexanol half-capped toluene diisocyanate was added to the dimethylethanolamine in a suitable reaction vessel at room temperature. The mixture exothermed and was stirred for one hour at 80° C. Lactic acid was then charged followed by the addition of 2-butoxyethanol. The reaction mixture was stirred for about one hour at 65° C. to form the desired quaternizing agent.

Pigment Grinding Vehicle

EXAMPLE J

A pigment grinding vehicle was prepared from the following charge:

| Ingredients | Parts by Weight | Solids |
|---|---|---|
| EPON 829 | 722.10 | 693.20 |
| Bisphenol A | 278.40 | 278.40 |
| 2-Ethylhexanol monourethane of 2,4-toluene diisocyanate in methyl isobutyl ketone | 406.40 | 386.10 |
| Quaternizing Agent as described above | 553 | 470 |
| Deionized water | 71.2 | |
| 2-Butoxyethanol | 1490 | |

The EPON 829 and bisphenol A were charged under a nitrogen atmosphere to a suitable reaction vessel and heated to 150°–160° C. to initiate an exotherm. The reaction mixture was permitted to exotherm for one hour at 150°–160° C. The reaction mixture was then cooled to 120° C. and the 2-ethylhexanol half-capped toluene diisocyanate added. The temperature of the reaction mixture was held at 110°–120° C. for one hour followed by the addition of the 2-butoxyethanol. The reaction mixture was then cooled to 85°–90° C., homogenized and then charged with water followed by the addition of the quaternizing agent. The temperature of the reaction mixture was held at 80°–85° C. until an acid value of about 1 was obtained.

EXAMPLE K

A dibutyltinoxide catalyst paste was prepared as follows:

| Ingredients | Parts by Weight |
|---|---|
| Pigment Grinding Vehicle of Example J | 28.3 |
| Dibutyltinoxide | 25.0 |
| Deionized water | 46.7 |

The above ingredients were ground in a mill to a Hegman No. 7 grind.

EXAMPLE L

A pigment paste was prepared from the following mixture of ingredients:

| Ingredients | Parts by Weight |
|---|---|
| Titanium dioxide | 44.42 |
| Lead silicate | 2.9 |
| Carbon black | 0.37 |
| Pigment Grinding Vehicle of Example J | 18.5 |
| Deionized water | 27.51 |
| Catalyst Paste as described above | 6.3 |

The above ingredients were ground in a mill to a Hegman No. 7 grind.

Cationic Electrodepositable Coating Compositions

The following examples are of cationic electrodepositable coating compositions containing the novel additives of the invention to enhance surface appearance without adversely affecting adhesiveness. The compositions were cathodically electrodeposited over zinc phosphate pretreated steel panels, the electrodeposited coatings cured at elevated temperature, and the cured coating evaluated for surface appearance. The cured electrodeposited coatings were then coated with various alkyd and polyester coating compositions, and the top coat cured and evaluated for adhesion to the electrodeposition primer. The dry film thickness of the top coat was about 35–40 microns. For comparative purposes, compositions with an additive of the prior art (U.S. Pat. No. 4,432,850), and for the purposes of control, compositions with no additive were also evaluated. The results of the testing are summarized in Table I below.

EXAMPLE 1

As a control, a cationic electrodeposition bath with no additive was prepared by blending the following mixture of ingredients:

| Ingredients | Parts by Weight |
|---|---|
| Cationic Electrodeposition Resin of Example A | 1316 |
| Pigment Paste of Example L | 210 |
| Deionized water | 1474 |

The bath had a pH of 6.6 and a resistivity at 20° C. of 660 ohm cm$^{-1}$. Zinc phosphate pretreated steel panels were cathodically electrocoated in the electrodeposition bath at 240 volts for 2 minutes at a bath temperature of 27° C. The wet films were cured at 170° C. for 30 minutes.

EXAMPLE 2

As a comparative example, a cationic electrodeposition bath with the additive of U.S. Pat. No. 4,432,850 was prepared by blending the following mixture of ingredients:

| Ingredients | Parts by Weight |
|---|---|
| Cationic Electrodeposition Resin of Example A | 1270 |
| Reaction Product of Example I | 46 |
| Pigment Paste of Example L | 210 |
| Deionized water | 1440 |

The bath had a pH of 6.6 and a resistivity at 20° C. of 680 ohm cm$^{-1}$. Phosphated pretreated steel panels were cathodically electrocoated and cured as described for Example 1.

EXAMPLE 3

A resin mixture was prepared by blending the following ingredients:

| Ingredients | Parts by Weight |
|---|---|
| Grinding Vehicle of Example J | 27 |
| Reaction Product of Example C | 16 |
| Deionized water | 37 |
| Cationic Resin of Example A | 1233 |

The grinding vehicle and reaction product of Example C were mixed together for 20 minutes at room temperature, then the deionized water was added slowly under good agitation. The solution was agitated for 30 minutes and then incorporated into the cationic resin of Example A.

A cationic electrodeposition bath containing the adduct of Example C was then prepared by blending the following ingredients:

| Ingredients | Parts by Weight |
|---|---|
| Resin mixture as described above | 1313 |
| Pigment Paste of Example L | 210 |
| Deionized water | 1477 |

The bath had a pH of 6.7 and a resistivity at 20° C. of 800 ohm cm$^{-1}$. Zinc phosphate pretreated steel panels were cathodically electrocoated as described for Example 1.

EXAMPLE 4

A resin mixture was prepared by blending the following ingredients:

| Ingredients | Parts by Weight |
|---|---|
| Grinding Vehicle of Example J | 27 |
| Reaction Product of Example G | 16 |
| Deionized water | 37 |
| Cationic Resin of Example A | 1233 |

The components were mixed as described for Example 3. A cationic electrodeposition bath was prepared by blending 1313 parts by weight of the resin mixture, 210 parts by weight of the pigment paste of Example L and 1477 parts by weight of deionized water. The bath had a pH of 6.6 and a resistivity at 20° C. of 680 ohm cm$^{-1}$. Zinc phosphate pretreated steel panels were cathodically electrodeposited as described in Example 1.

EXAMPLE 5

A resin mixture was prepared by blending the following ingredients:

| Ingredients | Parts by Weight |
|---|---|
| Grinding Vehicle of Example J | 27 |
| Reaction Product of Example B | 16 |
| Deionized water | 37 |
| Cationic Resin of Example A | 1233 |

A cationic electrodeposition bath was prepared by blending 1313 parts by weight of the resin mixture, 210 parts by weight of the pigment paste of Example L and 1477 parts by weight of deionized water. The bath had a pH of 6.45 and a resistivity at 20° C. of 680 ohm cm$^{-1}$. Zinc phosphate pretreated steel panels were cathodically electrodeposited as described in Example 1.

EXAMPLE 6

A resin mixture was prepared by blending the following ingredients:

| Ingredients | Parts by Weight |
|---|---|
| Grinding Vehicle of Example J | 27 |
| Reaction Product of Example H | 18 |
| Deionized water | 35 |
| Cationic Resin of Example A | 1233 |

A cationic electrodeposition bath was prepared by blending 1313 parts by weight of the resin mixture, 210 parts by weight of the pigment paste of Example L and 1477 parts by weight of deionized water. The bath had a pH of 6.70 and a resistivity at 20° C. of 740 ohm cm$^{-1}$. Zinc phosphate pretreated steel panels were cathodically electrodeposited as described in Example 1.

EXAMPLE 7

A cationic electrodeposition bath was prepared by blending the following ingredients:

| Ingredients | Parts by Weight |
|---|---|
| Cationic Electrodeposition Resin of Example A | 1270 |
| Reaction Product of Example F | 46 |
| Pigment Paste of Example L | 210 |
| Deionized water | 1474 |

The bath had a pH of 6.6 and a resistivity at 20° C. of 700 ohm cm$^{-1}$.

TABLE I

Surface Appearance and Adhesion Properties of Cationic Electrodeposition Primers

| Additive of Example Property | 1 none (control) | 2 I (comparative example) | 3 C | 4 G | 5 B | 6 H | 7 F |
|---|---|---|---|---|---|---|---|
| Film Thickness in microns | 16–17 | 17–18 | 17–18 | 18 | 17–18 | 17–18 | 16–18 |
| Surface Appearance[1] | 4–5 | 0–1 | 0–1 | 0 | 0 | 0–1 | 1 |
| Topcoat Adhesion by Crosshatch[2] Topcoat[3] | 0 | 5 | 0 | 0 | 0 | 0 | 0 |
| After 16 hours QCT test[4] | 0 | 5 | 0 | 0 | 0 | 0 | 0 |
| Topcoat 2[5] | 0 | 5 | 0 | 0 | 0 | 0 | 0 |
| QCT test | 0 | 5 | 0 | 0 | 0 | 0 | 0 |
| Topcoat 3[6] | 0 | 5 | 0 | 0 | 0 | 0 | 0 |
| QCT test | 0 | 5 | 0 | 0 | 0 | 0 | 0 |
| Topcoat 4[7] | 0 | 4–5 | 0 | 0 | 0 | 0 | 0 |
| QCT test | 0 | 4–5 | 0 | 0 | 0 | 0 | 0 |

[1]Surface appearance was evaluated visually. Ratings of 0 to 5 are assigned with 0 being very good with very few craters (small rough depressions in the surface of the coating) and 5 being very poor with many craters.
[2]Crosshatch adhesion determined by scribing a crosshatch pattern on the topcoat, taping the crosshatch area and pulling the tape away at a 180° angle. Coatings with good adhesion will not be removed by the tapes whereas coatings with poor adhesion will be pulled off. Ratings of 0 to 5 are assigned with 0 being very good, i.e., no topcoat removal, and 5 being very poor with complete topcoat removal.
[3]Topcoat is a conventional alkyd topcoat available from DuPont Cie. in Europe as Nero Black.
[4]Crosshatch adhesion determined as described above but after first treating the topcoated panel in a condensing humidity chamber at 60° C. (QCT chamber) for 16 hours.
[5]Topcoat 2 is a conventional alkyd topcoat available from Corona Cie. in Europe as Leaf Green.
[6]Topcoat 3 is a conventioanl alkyd topcoat available from Corona Cie. in Europe as Beige Atlas.
[7]Topcoat 4 is a conventional polyester topcoat available from Levis Cie. in Europe as Rosso Levis.

We claim:

1. An ungelled polyoxyalkylenepolyamine reaction product which is suitable for use in cationic electrodeposition which is characterized as the reaction product of a polyoxyalkylenepolyamine with a monoepoxide and optionally a polyfunctional material which contains groups capable of reacting with amino and/or hydroxyl groups in which the polyoxyalkylenepolyamine:monoepoxide:polyfunctional material are in the equivalent ratio of 1:0.01–1.7:0–1.0.

2. The reaction product of claim 1 in which the polyoxyalkylenepolyamine is first reacted with the monoepoxide and then optionally reacted with the polyfunctional material.

3. The product of claim 1 in which the polyoxyalkylenepolyamine contains oxypropylene moieties.

4. The product of claim 1 in which the polyoxyalkylenepolyamine is a diamine.

5. The product of claim 1 in which the polyoxyalkylenepolyamine has a molecular weight of 137–3600.

6. The product of claim 1 in which the monoepoxide is selected from those having the following formula:

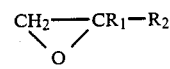

where $R_1$ is hydrogen and methyl and $R_2$ is alkyl including cycloalkyl, aryl and substituted alkyl and aryl groups.

7. The product of claim 6 in which the monoepoxide is selected from the class consisting of butyl glycidyl ether, 2-ethylhexylglycidylether, and styrene oxide.

8. The product of claim 1 in which the polyfunctional material is selected from the class consisting of polyacrylates, polyisocyanates, polycarboxylic acids and polyepoxides.

9. The product of claim 1 in which the polyoxyalkylenepolyamine is first reacted with the monoepoxide such that the amine/epoxide equivalent ratio is greater than 1 and the reaction product is further reacted with a polyacrylate.

10. The product of claim 1 in which the polyoxyalkylenepolyamine is first reacted with the monoepoxide and the reaction product is further reacted with a polyisocyanate.

11. The product of claim 1 which is at least partially neutralized with acid.

12. The product of claim 1 which contains blocked polyisocyanate functionality.

13. An aqueous resinous dispersion which contains a cationic electrodepositable resin and from 0.1 to 50 percent by weight of the product of claim 11; the percentage by weight being based on weight of resin solids.

14. The aqueous dispersion of claim 13 which contains a blocked polyisocyanate curing agent.

15. A method of electrocoating an electrically conductive surface serving as a cathode in an electrical circuit comprising said cathode and an anode immersed in an aqueous resinous dispersion, comprising passing electric current between the anode and the cathode to cause a coating composition to deposit on the cathode, wherein the aqueous resinous dispersion is that of claim 13.

16. The method of claim 15 in which the aqueous resinous dispersion contains a blocked polyisocyanate curing agent.

* * * * *

UNITED STATES PATENT AND TRADEMARK OFFICE
CERTIFICATE OF CORRECTION

PATENT NO. : 4,689,131

DATED : August 25, 1987

INVENTOR(S) : Jean Roue et al

It is certified that error appears in the above-identified patent and that said Letters Patent is hereby corrected as shown below:

Column 19, line 1, insert --hydrogen,-- after "$R_2$ is".

Signed and Sealed this

Twenty-second Day of December, 1987

Attest:

DONALD J. QUIGG

*Attesting Officer*   *Commissioner of Patents and Trademarks*